US007903646B2

(12) United States Patent  
Ikeda

(10) Patent No.: US 7,903,646 B2
(45) Date of Patent: Mar. 8, 2011

(54) WIRELESS COMMUNICATION SYSTEM ALLOWING GROUP IDENTIFICATION INFORMATION TO BE PUBLICLY AVAILABLE AND TO BE HIDDEN, WIRELESS ACCESS POINT DEVICE, AND COMMUNICATION METHOD AND PROGRAM FOR WIRELESS ACCESS POINT DEVICE

(75) Inventor: Nobuhiro Ikeda, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1302 days.

(21) Appl. No.: 11/071,039

(22) Filed: Mar. 2, 2005

(65) Prior Publication Data

US 2005/0195781 A1 Sep. 8, 2005

(30) Foreign Application Priority Data

Mar. 5, 2004 (JP) ................................ 2004-062392

(51) Int. Cl.
*H04L 12/28* (2006.01)
*H04W 4/00* (2009.01)
(52) U.S. Cl. ................ 370/389; 370/338; 713/155
(58) Field of Classification Search .................. 370/245, 370/232, 254
See application file for complete search history.

(56) References Cited

U.S. PATENT DOCUMENTS

| 7,554,979 B2* | 6/2009 | Ikeda ........................... 370/389 |
| 2002/0176366 A1 | 11/2002 | Ayyagari et al. |
| 2004/0095942 A1 | 5/2004 | Lung |
| 2004/0131187 A1* | 7/2004 | Takao et al. .................. 380/255 |
| 2004/0248557 A1 | 12/2004 | Muratsu |

FOREIGN PATENT DOCUMENTS

| JP | 2002-344458 | | 11/2002 |
| JP | 2003-101553 A | | 4/2003 |
| JP | 2004-363878 A | | 12/2004 |
| TW | 577237 B | | 2/2004 |

OTHER PUBLICATIONS

English Translation of Chinese Office Action dated Apr. 11, 2008 for Chinese Patent Application No. 2005100541200, which is the foreign counterpart of the present application is provided. (2 pages).

* cited by examiner

*Primary Examiner* — Charles N Appiah
*Assistant Examiner* — Natasha Cosme
(74) *Attorney, Agent, or Firm* — Cowan, Liebowitz & Latman, P.C.

(57) ABSTRACT

According to the present invention, the host device judges whether or not to grant a connection permission to the wireless communication device. Having been instructed to start the entry processing, the wireless access point device sends a beacon with group identification information made publicly available. Upon reception of the beacon, the wireless communication device performs an authentication processing and an association processing with the wireless access point device and further performs the authentication processing. Having been instructed to end the entry processing, the wireless access point device switches into the sending of the beacon with the group identification information hidden, thereby hiding the group identification information from other wireless access point devices.

18 Claims, 13 Drawing Sheets

SEQUENCE CHART 1 OF PROCESSING ACCORDING TO SECOND EMBODIMENT

WIRELESS COMMUNICATION SYSTEM ALLOWING GROUP IDENTIFICATION INFORMATION TO BE PUBLICLY AVAILABLE AND TO BE HIDDEN, WIRELESS ACCESS POINT DEVICE, AND COMMUNICATION METHOD AND PROGRAM FOR WIRELESS ACCESS POINT DEVICE

BACKGROUND OF THE INVENTION

1. Field of the Invention

The present invention relates to a wireless communication system allowing group identification information to be publicly available and to be hidden, a wireless access point device, and a communication method and program for a wireless access point device.

2. Related Background Art

A conventional wireless LAN system based on the IEEE 802.11X standards needs to set the same group identifier (SSID) in an access point and a terminal. This setup, which requires consideration of a difference in topology such as an ad hoc mode or an infrastructure mode, suits a user who is rather familiar to a personal computer (PC), but does not suit a PC beginner. Recent techniques in this field include a system in which an application on a terminal automatically detects a plurality of nearby group identifiers (SSID), creates a list of access points to which the terminal can be connected based on detection results, and causes a user to select an access point to be connected from the list. Aside from the consideration of security using encryption, such a wireless communication support can establish a connection to a network almost automatically without complicate operations by a user. Those situations have started to apply the above recent techniques to home use.

In addition, Wired Equivalent Privacy (WEP) is generally used as a security system. According to the WEP, a key shared between a wireless access point and a wireless client is used to encrypt communication data to be transmitted. Thus, even if the transmission is tapped, information cannot be read as long as a cipher key is not decrypted. However, the cipher key according to the WEP encryption system can logically be decrypted with much time, which infers that the WEP can never provide a perfect security system.

Meanwhile, in the case where a wireless LAN system is used for office use such as use in an enterprise, higher importance is placed on a security issue than for home use.

It is possible a group identifier (SSID) made publicly available is undesirably accessed by a wireless terminal (vicious third party) irrelevant to a user. In view of this, access point devices having a stealth mode, in which the group identifier (SSID) is hidden intentionally after confirmation of an established connection to a desired wireless terminal, are expanding in the market in recent years.

However, in order that the access point devices having a stealth mode with the group identifier (SSID) hidden intentionally may accept a connection to a new wireless terminal, the user of a wireless terminal previously learns the group identifier (SSID) and individually performs setup. Alternatively, an administrator of the access point device cancels the stealth mode temporarily, and causes the user to select a list of access points that can be accessed. Accordingly, the administrator of the access, point device and the user of the wireless terminal conventionally require complicate operations, remarkably reducing convenience and operability of the system.

SUMMARY OF THE INVENTION

It is an object of the present invention to automatically allow group identification information to be publicly available and to be hidden as necessary.

Further, it is another object of the present invention to realize flexible control of connections between wireless communication devices, and avoid system resource starvation due to unnecessary access from a wireless communication device, deterioration in performance, and needless loads, thereby balancing ease of access and robust security.

Other objects of the present invention will be apparent by reading the following specification and the accompanying drawings.

DESCRIPTION OF THE PREFERRED EMBODIMENTS

Hereinafter, the accompanying drawings are used to describe a wireless communication system based on the IEEE 802.11X standards according to the present invention.

Figure 1:
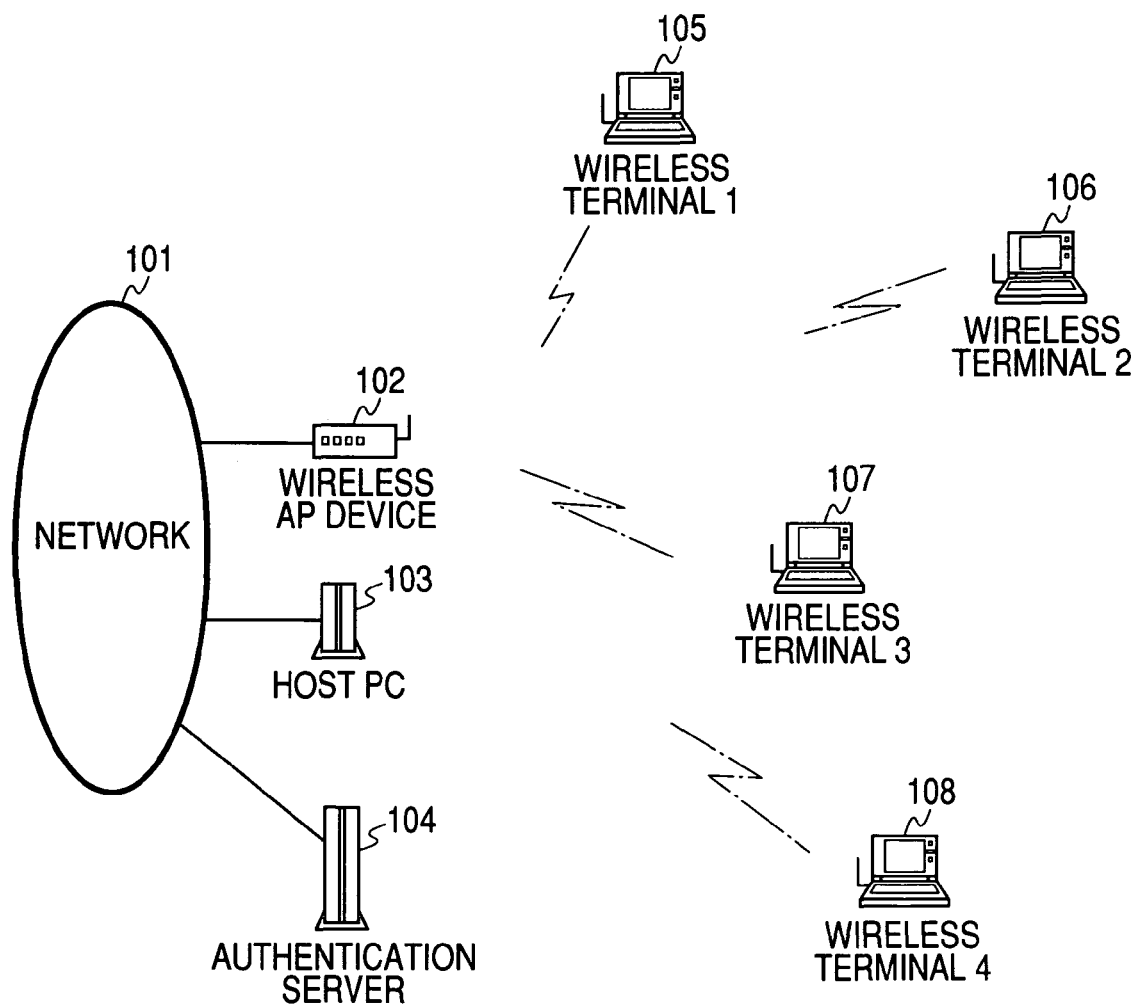
FIG. 1 is a configuration diagram of a wireless communication system according to an embodiment of the present invention.

FIG. 1 is a configuration diagram of a wireless communication system according to an embodiment of the present invention. In FIG. 1, a wireless access point device 102 establishes a wireless communication link with wireless terminals 105 to 108. An authentication server terminal 104, the wireless access point device 102, and a host PC 103 are connected to a network 101 via wires, and provide a data transmission control function and a path selection function in the network 101. The authentication server terminal 104 also performs control regarding an authentication sequence processing between an arbitrary client terminal within the network 101 and each of the wireless terminals 105 to 108 that are accepted to connect to the wireless access point device 102.

Figure 2:
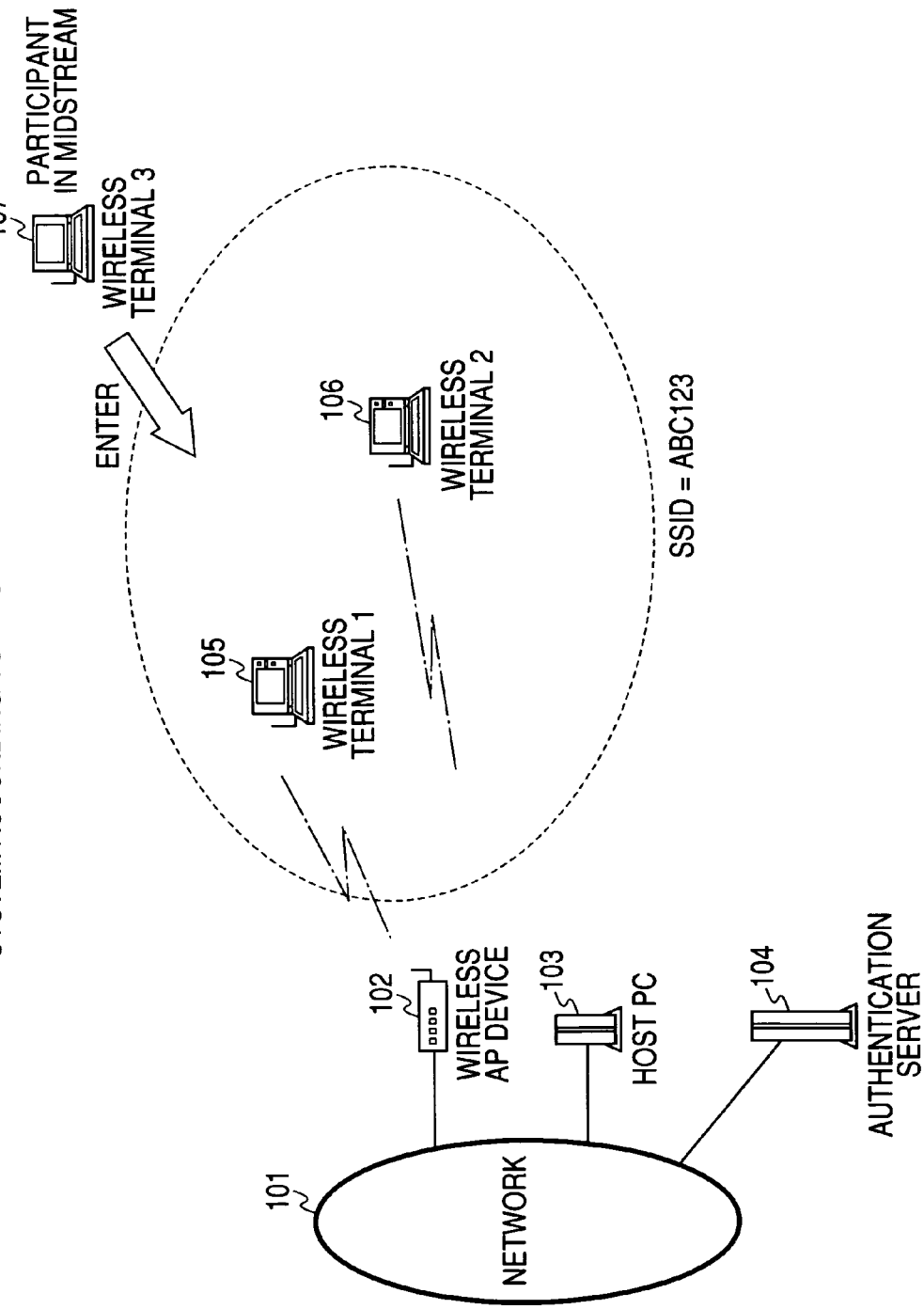
FIG. 2 is another configuration diagram of the wireless communication system according to a first embodiment of the present invention.

FIG. 2 is a system configuration diagram according to a first embodiment which illustrates a case where a wireless terminal 3 (107) enters an area forming a group of a wireless terminal 1 (105) and a wireless terminal 2 (106) based on a group identifier: SSID1. Details of reference numerals and names that are used in the drawing are the same as FIG. 1.

Figure 9:
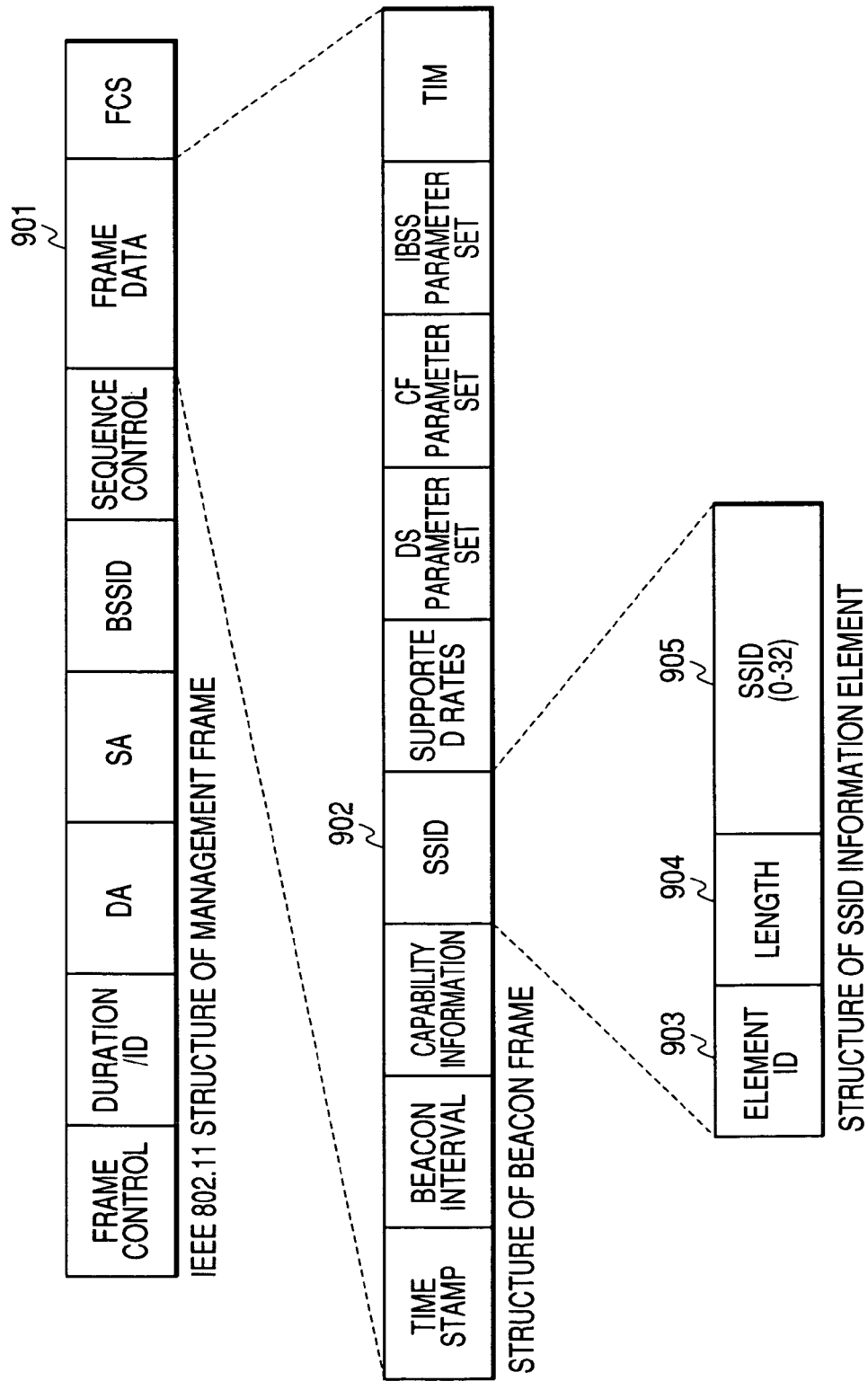
FIG. 9 is a structural diagram of a data frame format of beacon information.

FIG. 9 illustrates an IEEE 802.11 management frame data format including a beacon frame structure, which is used in this embodiment. In FIG. 9, frame data 901 represents a structure of a beacon frame, and includes an SSID 902. In particular, the SSID 902 is an area in which information on a group identifier is set, and includes an Element ID 903, a Length 904, and a group identifier (SSID) 905. The Element ID 903 represents an information element identifier, and the Length 904 represents the length of SSID data set in an SSID 905 area having a maximum size of 32 bytes.

First Embodiment

Hereinafter, FIGS. 3 to 8 are used to describe a wireless communication system according to the first embodiment of the present invention.

Figure 3:
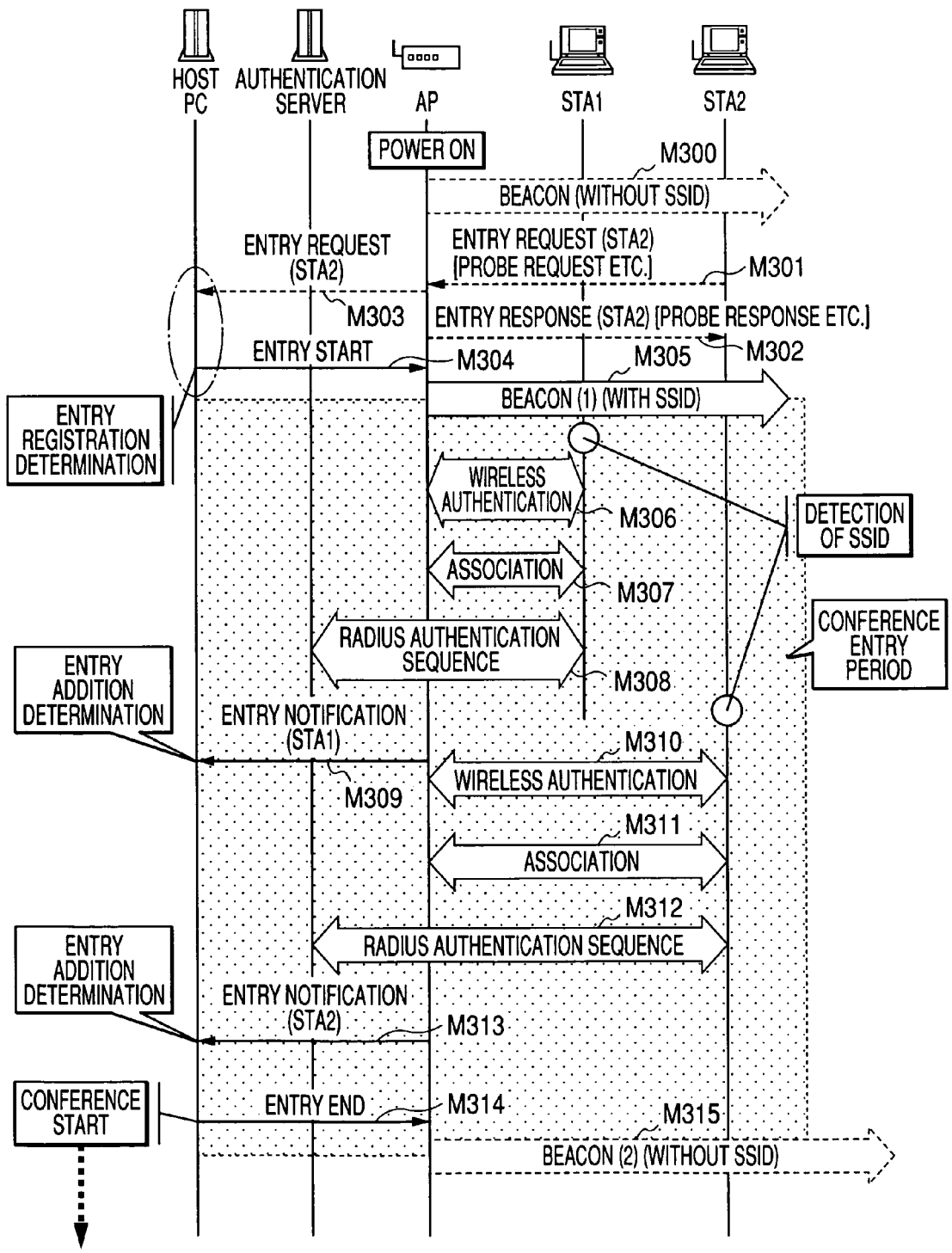
FIG. 3 is a sequence chart of a processing according to the first embodiment.
Figure 4:
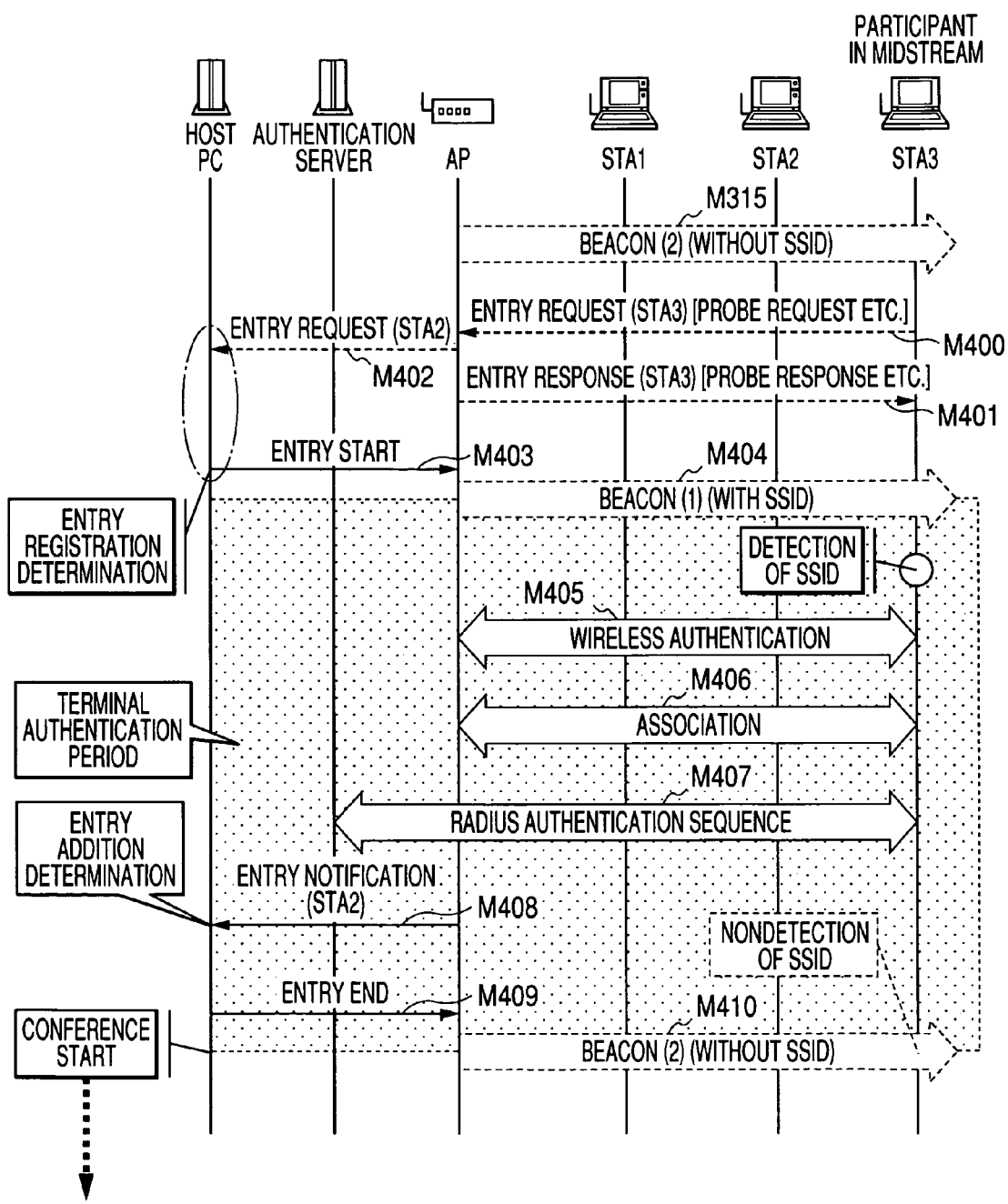
FIG. 4 is another sequence chart of the processing according to the first embodiment.
Figure 5:
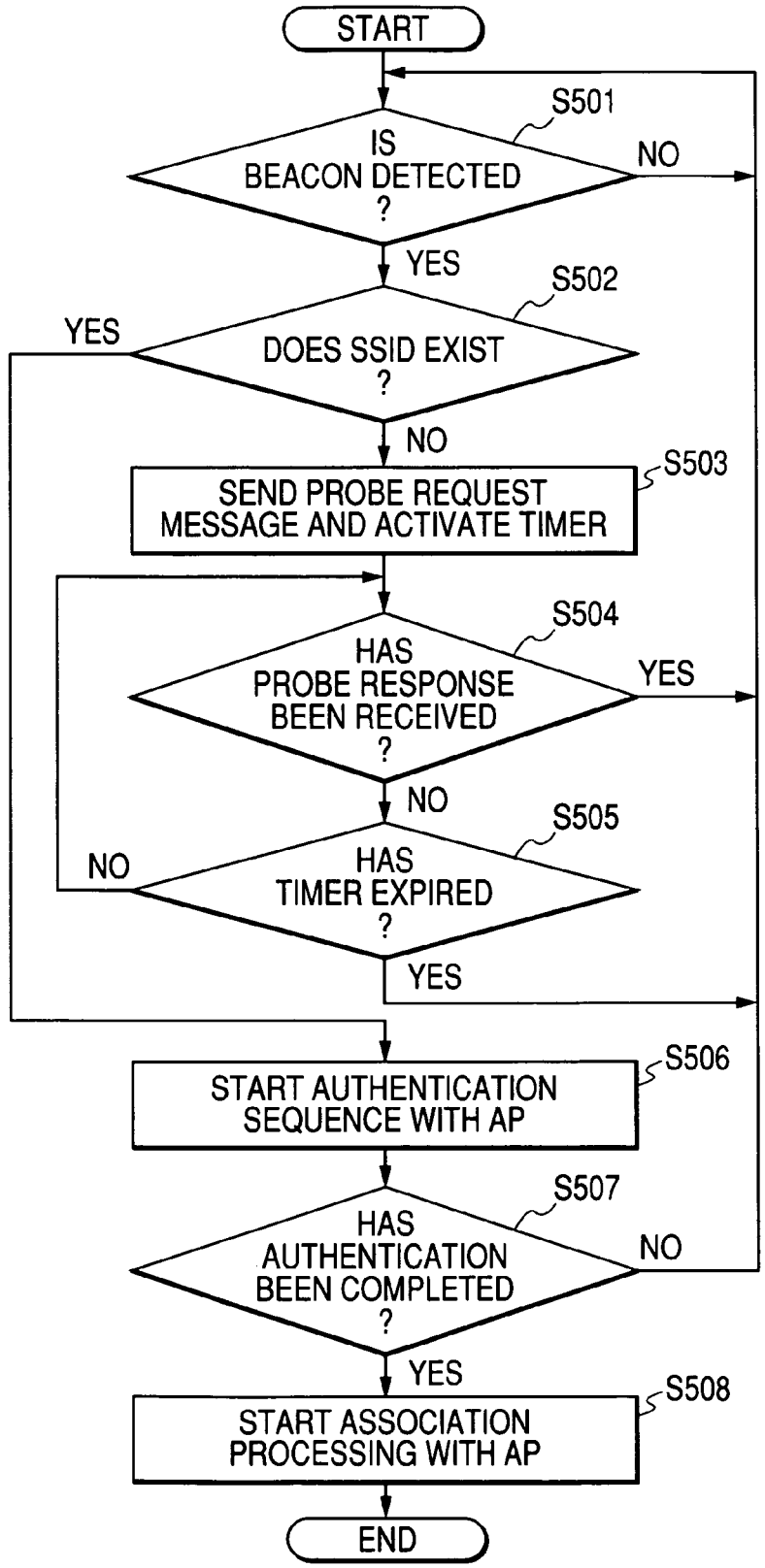
FIG. 5 is a process flowchart of a wireless terminal.
Figure 6:
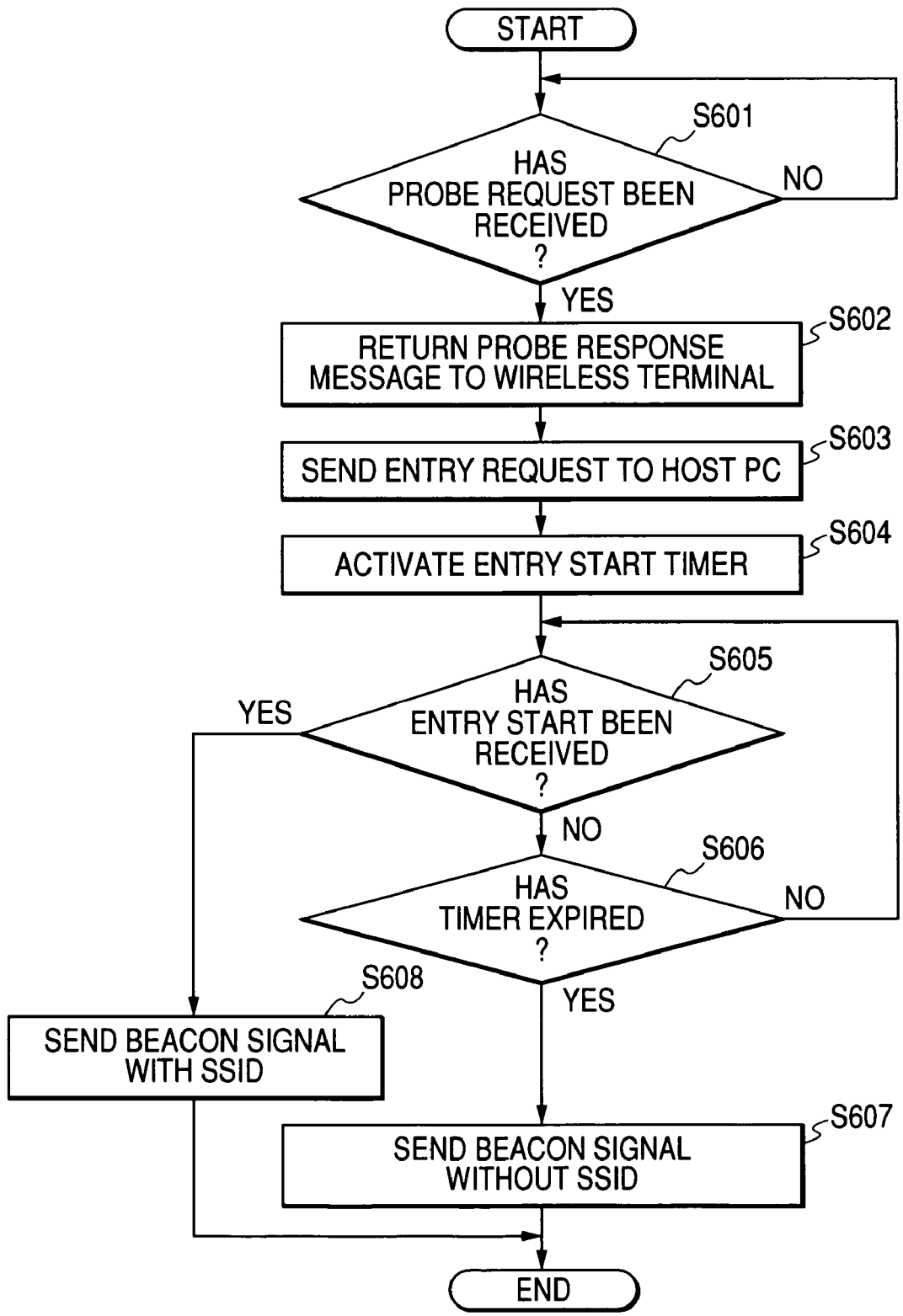
FIG. 6 is a process flowchart of an access point device.
Figure 7:
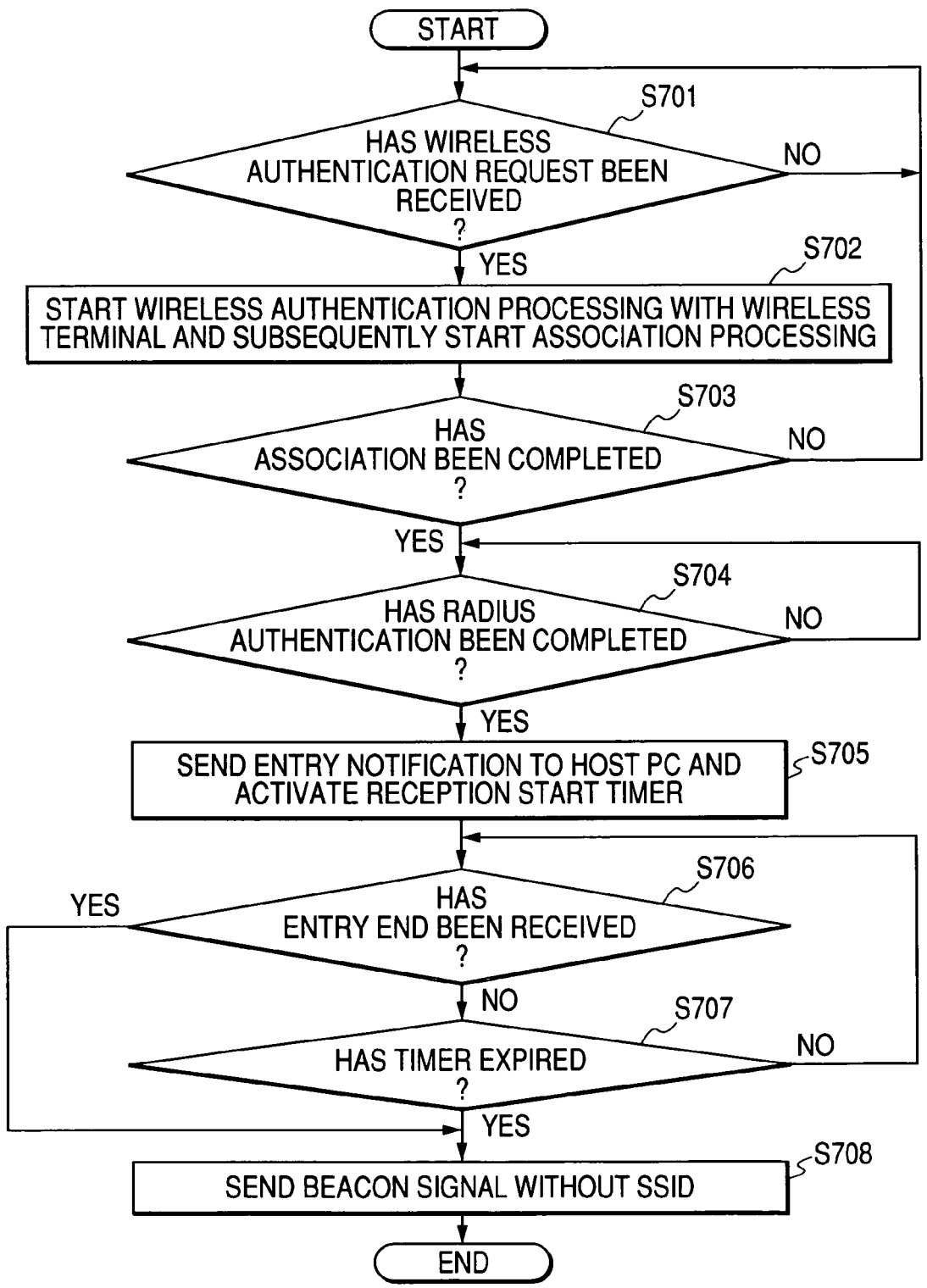
FIG. 7 is another process flowchart of the access point device.
Figure 8:
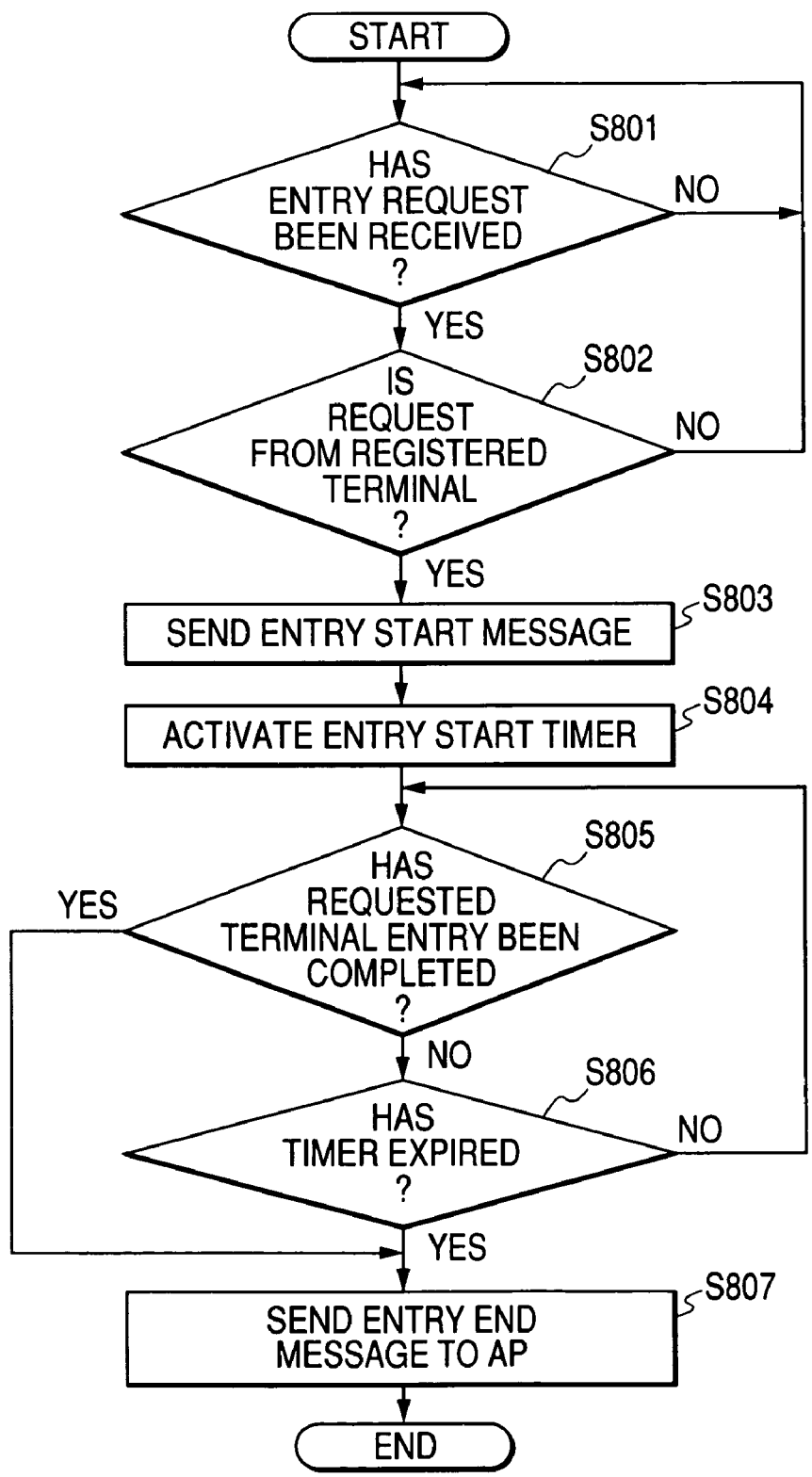
FIG. 8 is a process flowchart of a host PC according to the first embodiment.

FIG. 3 is a sequence chart 1 of a processing according to the first embodiment; FIG. 4 is a sequence chart 2 of the processing according to the first embodiment; FIG. 5 is a process flowchart of the wireless terminal 107 according to the first embodiment; FIG. 6 is a process flowchart 1 of the access point device 102 according to the first embodiment; FIG. 7 is a process flowchart 2 of the access point device according to the first embodiment; and FIG. 8 is a process flowchart of the host PC 103 according to the first embodiment.

Only main messages involved in this embodiment are indicated in the above-mentioned sequence drawings. Other basic messages are partially omitted.

In FIG. 3, the power of the wireless access point device 102 in the wireless communication system is turned on, and starts to send out a beacon signal M300. At this time, in the SSID information element of the data frame of the beacon signal M300, the Length 904 is "0," and data is not set in the group identifier (SSID) 905. In other words, the beacon signal M300 indicates a state where a stealth mode is ON. In such a state, when the wireless terminal 2 (106) detects the beacon signal M300 <Step S501 of FIG. 5: YES> and finds that the group identifier (SSID) 905 does not exist <Step S502 of FIG. 5: NO>, the wireless terminal 2 (106) makes an inquiry about whether or not a wireless cell is available in the vicinity. In order to find the wireless access point device 102 that is connection-acceptable, the wireless terminal 2 (106) sends out an entry request message (probe request or the like for IEEE 802.11b) M301, and activates a response timer (Step S503 of FIG. 5).

Upon reception of the entry request message M301 <Step S601 of FIG. 6: YES>, the wireless access point device 102 sends an entry response message (probe response or the like for IEEE 802.11b) M302 to the wireless terminal 2 (106) (Step S602 of FIG. 6). Subsequently, the wireless access point device 102 sends an entry request message M303 to the host PC 103 (Step S603 of FIG. 6), and activates an entry start timer (Step S604 of FIG. 6).

Upon reception of the entry response message M302 <Step S504 of FIG. 5: YES>, the wireless terminal 2 (106) shifts to a state for detecting a new beacon signal (Step S501 of FIG. 5). If the entry response message M302 cannot be received <Step S504 of FIG. 5: NO>, the wireless terminal 2 (106) checks whether or not the timer has expired, and if the timer has not expired <Step S505 of FIG. 5: NO>, shifts back to a state of waiting for the entry response message M302 from the wireless access point device 102 (Step S504 of FIG. 5). If the timer has expired <Step S505 of FIG. 5: YES>, the wireless terminal 2 (106) shifts to the state for detecting a new beacon signal (Step S501 of FIG. 5).

Meanwhile, upon reception of the entry request message M303 <Step S801 of FIG. 8: YES>, the host PC 103 judges whether or not the received entry request message M303 has been sent from a registered terminal that is previously registered in a memory. If being requested from the registered (permitted) terminal <Step S802 of FIG. 8: YES>, the host PC 103 sends an entry start message M304 to the wireless access point device 102 (Step S803 of FIG. 8), and activates an entry start timer (Step S804 of FIG. 8). Upon reception of the entry start message M304 <Step S605 of FIG. 6: YES>, the wireless access point device 102 starts to send out a beacon signal M305. At this time, in the SSID information element of the data frame of the beacon signal M305, an authorized group identifier data is set in the group identifier (SSID) 905, and a predetermined value is set in the Length 904. In other words, the beacon signal M305 indicates a state where the stealth mode is OFF (Step S608 of FIG. 6). In such a state, the wireless terminal 1 (105) detects the beacon signal M305 <Step S501 of FIG. 5: YES>. At this time, a group identifier (SSID=ABC123) 905 exists <Step S502 of FIG. 5: YES>, so the wireless access point device 102 is listed up as a connectable wireless access point device.

After that, by a selection operation of the wireless terminal 1 (105) by the user, the wireless terminal 1 (105) sends a wireless authentication request to the wireless access point device 102, and executes an authentication sequence processing M306 (Step S506 of FIG. 5). Upon reception of the wireless authentication request <Step S701 of FIG. 7: YES>, the wireless access point device 102 executes the authentication sequence processing M306 with respect to the wireless terminal 1 (105) (Step S702 of FIG. 7).

Upon completion of the authentication sequence processing M306 <Step S507 of FIG. 5: YES>, the wireless terminal 1 (105) executes an association processing M307 with respect to the wireless access point device 102 (Step S508 of FIG. 5 and Step S702 of FIG. 7). Upon completion of the association processing M307 <Step S703 of FIG. 7: YES>, the wireless access point device 102 shifts to a state of waiting for execution completion detection of a RADIUS authentication sequence M308 that is executed between the wireless terminal 1 (105) and the authentication server terminal 104 (Step S704 of FIG. 7). Upon completion of the RADIUS authentication sequence M308 <Step S704 of FIG. 7: YES>, the wireless access point device 102 sends an entry notification message M309 to the host PC 103, and activates a timer for waiting to receive an entry end message (Step S705 of FIG. 7).

Similarly to the case with the wireless terminal 1 (105), when the stealth mode is OFF in the wireless access point device 102 (Step S608 of FIG. 6), the wireless terminal 2 (106) detects the beacon signal M305 <Step S501 of FIG. 5: YES>. In this case, the group identifier (SSID =ABC123) 905 exists <Step S502 of FIG. 5: YES>, so the wireless access point device 102 is listed up as a wireless access point device to which the wireless terminal 2 (106) can be connected.

After that, by a selection operation of the wireless terminal 2 (106) by the user, the wireless terminal 2 (106) sends a wireless authentication request to the wireless access point device 102, and executes an authentication sequence processing M310 (Step S506 of FIG. 5). Upon reception of the wireless authentication request <Step S701 of FIG. 7: YES>, the wireless access point device 102 executes the authentication sequence processing M310 with respect to the wireless terminal 2 (106) (Step S702 of FIG. 7).

Upon completion of the authentication sequence processing M310 <Step S507 of FIG. 5: YES>, the wireless terminal 2 (106) executes an association processing M311 with respect to the wireless access point device 102 (Step S508 of FIG. 5 and Step S702 of FIG. 7). Upon completion of the association processing M311 <Step S703 of FIG. 7: YES>, the wireless access point device 102 shifts to a state of waiting for execution completion detection of a RADIUS authentication sequence M312 that is executed between the wireless terminal 2 (106) and the authentication server terminal 104 (Step S704 of FIG. 7). Upon completion of the RADIUS authentication sequence M312 <Step S704 of FIG. 7: YES>, the wireless access point device 102 sends an entry notification message M313 to the host PC 103, and activates a timer for waiting to receive an entry end message (Step S705 of FIG. 7).

The host PC 103 receives the entry notification messages M313. When entries are complete regarding the wireless terminals that are previously registered in the memory <Step S805 of FIG. 8: YES> or when the entry start timer expires <Step S806 of FIG. 8: YES>, the host PC 103 sends an entry end message M314 to the wireless access point device 102 (Step S807 of FIG. 8). Upon reception of the entry end message M314 <Step S706 of FIG. 7: YES> or upon expiration of the timer for waiting to receive an entry end message <Step S707 of FIG. 7: YES>, the wireless access point device 102 starts to send out a beacon signal M315 (Step S708 of FIG. 7). At this time, in the SSID information element of the data frame of the beacon signal M315, the Length 904 is "0," and data is not set in the group identifier (SSID) 905. In other words, the beacon signal M315 indicates the state where the stealth mode is ON.

Accordingly, the wireless access point device 102, the wireless terminal 1 (105), and the wireless terminal 2 (106) form a wireless network configured based on the group identifier (SSID)=ABC123.

Meanwhile, upon reception of the entry request message M303 <Step S801 of FIG. 8: YES>, the host PC 103 judges whether or not the received entry request message M303 has been sent from a registered terminal. If being requested from a non-registered terminal <Step S802 of FIG. 8: NO>, the host PC 103 shifts back to a state of waiting for the entry request message M303 (Step S801 of FIG. 8). As a result, if the wireless access point device 102 cannot receive the entry start message M304 <Step S605 of FIG. 6: NO>, the wireless terminal 2 (106) checks whether or not the timer has expired, and if the timer has not expired <Step S606 of FIG. 6: NO>, shifts back to a state of waiting for the entry start message M304 from the host PC 103 (Step S605 of FIG. 6).

If the timer has expired <Step S606 of FIG. 6: YES>, the wireless access point device 102 starts to send out another beacon signal. At this time, in the SSID information element of the data frame of the beacon signal, the Length 904 is "0," and data is not set in the group identifier (SSID) 905. In other words, the beacon signal indicates the state where the stealth mode is ON.

Referring to FIG. 4, when a user of the wireless terminal 3 (107) in its use moves into a service area managed by the wireless network configured based on the group identifier (SSID)=ABC123, or when a startup operation such as power ON is executed on a wireless terminal, the wireless terminal 3 (107) detects the beacon signal M315 without the SSID <Step S501 of FIG. 5: YES>. If the group identifier (SSID) 905 does not exist <Step S502 of FIG. 5: NO>, in order to find the wireless access point device 102 that is connection-acceptable, the wireless terminal 3 (107) sends out the entry request message (probe request or the like for IEEE 802.11b) M400, and activates a response timer (Step S503 of FIG. 5).

Upon reception of the entry request message M400 <Step S601 of FIG. 6: YES>, the wireless access point device 102 sends an entry response message (probe response or the like for IEEE 802.11b) M401 to the wireless terminal 3 (107) (Step S602 of FIG. 6), sends an entry request message M402 to the host PC 103 (Step S603 of FIG. 6), and activates the entry start timer (Step S604 of FIG. 6).

Upon reception of the entry response message M401 <Step S504 of FIG. 5: YES>, the wireless terminal 3 (107) shifts to a state for detecting a new beacon signal (Step S501 of FIG. 5). If the entry response message M401 cannot be received <Step S504 of FIG. 5: NO>, the wireless terminal 3 (107) checks whether or not the timer has expired, and if the timer has not expired <Step S505 of FIG. 5: NO>, shifts back to a state of waiting for the entry response message M401 from the wireless access point device 102 (Step S504 of FIG. 5). If the timer has expired <Step S505 of FIG. 5: YES>, the wireless terminal 3 (107) shifts to the state for detecting a new beacon signal (Step S501 of FIG. 5).

Meanwhile, upon reception of the entry request message M402 <Step S801 of FIG. 8: YES>, the host PC 103 judges whether or not the received entry request message M402 has been sent from a registered terminal. If being requested from the registered (permitted) terminal <Step S802 of FIG. 8: YES>, the host PC 103 sends an entry start message M403 to the wireless access point device 102 (Step S803 of FIG. 8), and activates an entry start timer (Step S804 of FIG. 8). Upon reception of the entry start message M403 <Step S605 of FIG. 6: YES>, the wireless access point device 102 starts to send out a beacon signal M404. At this time, in the SSID information element of the data frame of the beacon signal M404, an authorized group identifier data is set in the group identifier (SSID) 905, and a predetermined value is set in the Length 904. In other words, the beacon signal M404 indicates the state where the stealth mode is OFF (Step S608 of FIG. 6). In such a state, the wireless terminal 3 (107) detects the beacon signal M404 <Step S501 of FIG. 5: YES>. At this time, a group identifier (SSID=ABC123) 905 exists <Step S502 of FIG. 5: YES>, so the wireless access point device 102 is listed up as a wireless access point device to which the wireless terminal 3 (107) can be connected.

After that, by a selection operation of the wireless terminal 3 (107) by the user, the wireless terminal 3 (107) sends a wireless authentication request to the wireless access point device 102, and executes an authentication sequence processing M405 (Step S506 of FIG. 5). Upon reception of the wireless authentication request <Step S701 of FIG. 7: YES>, the wireless access point device 102 executes the authentication sequence processing M405 with respect to the wireless terminal 3 (107) (Step S702 of FIG. 7).

Upon completion of the authentication sequence processing M405 <Step S507 of FIG. 5: YES>, the wireless terminal 3 (107) executes an association processing M406 with respect to the wireless access point device 102 (Step S508 of FIG. 5 and Step S702 of FIG. 7). Upon completion of the association processing M406 <Step S703 of FIG. 7: YES>, the wireless access point device 102 shifts to a state of waiting for execution completion detection of a RADIUS authentication sequence M407 that is executed between the wireless terminal 3 (107) and the authentication server terminal 104 (Step S704 of FIG. 7). Upon completion of the RADIUS authentication sequence M407 <Step S704 of FIG. 7: YES>, the wireless access point device 102 sends an entry notification message M408 to the host PC 103, and activates a timer for waiting to receive an entry end message (Step S705 of FIG. 7).

The host PC 103 receives the entry notification messages M408. When entries are complete regarding the wireless terminals that are previously registered in the memory <Step S805 of FIG. 8: YES> or when the entry start timer expires <Step S806 of FIG. 8: YES>, the host PC 103 sends an entry end message M409 to the wireless access point device 102 (Step S807 of FIG. 8). Upon reception of the entry end message M409 <Step S706 of FIG. 7: YES> or upon expiration of the timer for waiting to receive an entry end message <Step S707 of FIG. 7: YES>, the wireless access point device 102 starts to send out a beacon signal M410 (Step S708 of FIG. 7). At this time, in the SSID information element of the data frame of the beacon signal M410, the Length 904 is "0," and data is not set in the group identifier (SSID) 905. In other words, the beacon signal M410 indicates the state where the stealth mode is ON.

Accordingly, the wireless access point device 102, the wireless terminal 1 (105), the wireless terminal 2 (106), and the wireless terminal 3 (107) form a wireless network configured based on the group identifier (SSID)=ABC123.

Second Embodiment

Figure 10:
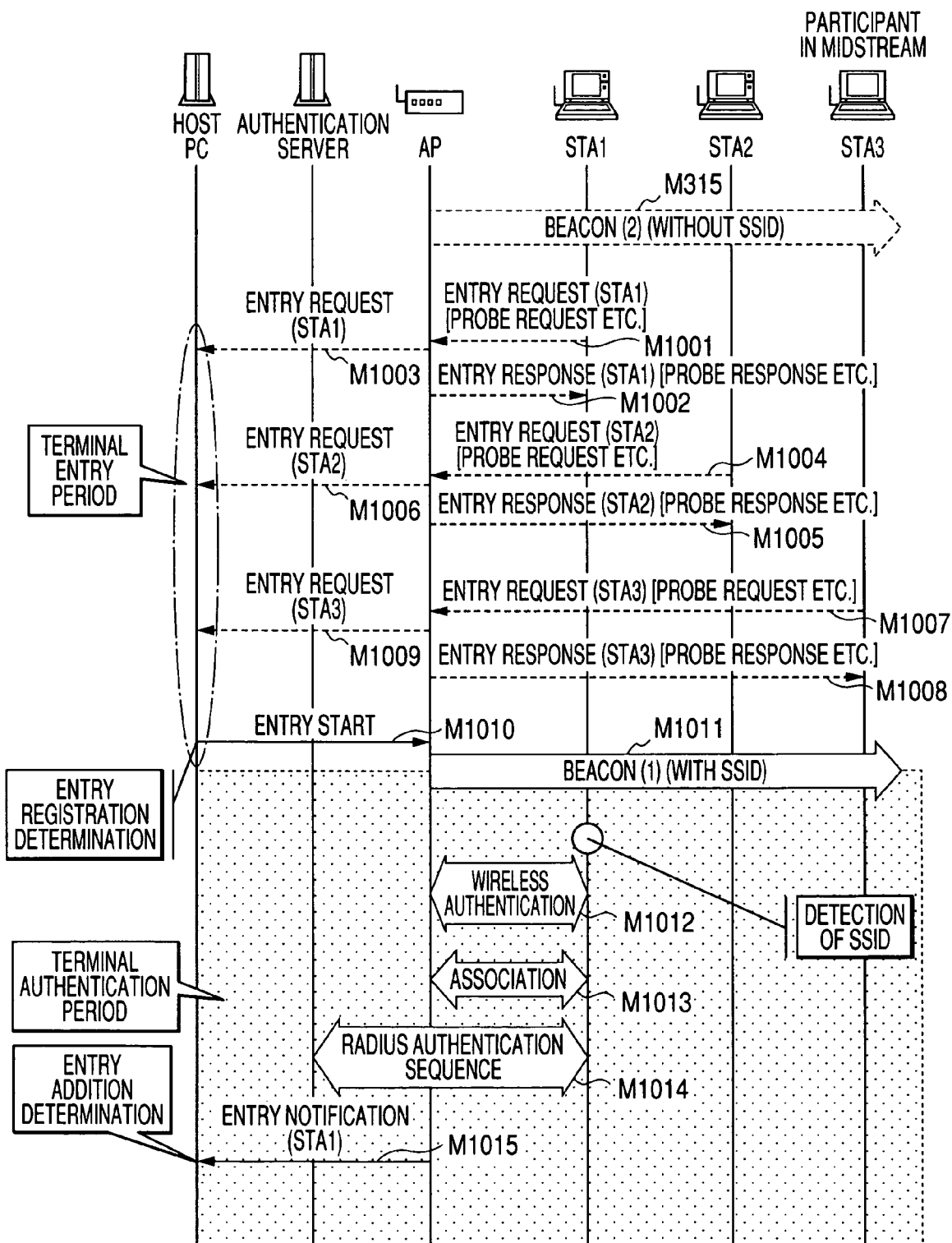
FIG. 10 is a sequence chart of a processing according to a second embodiment.
Figure 11:
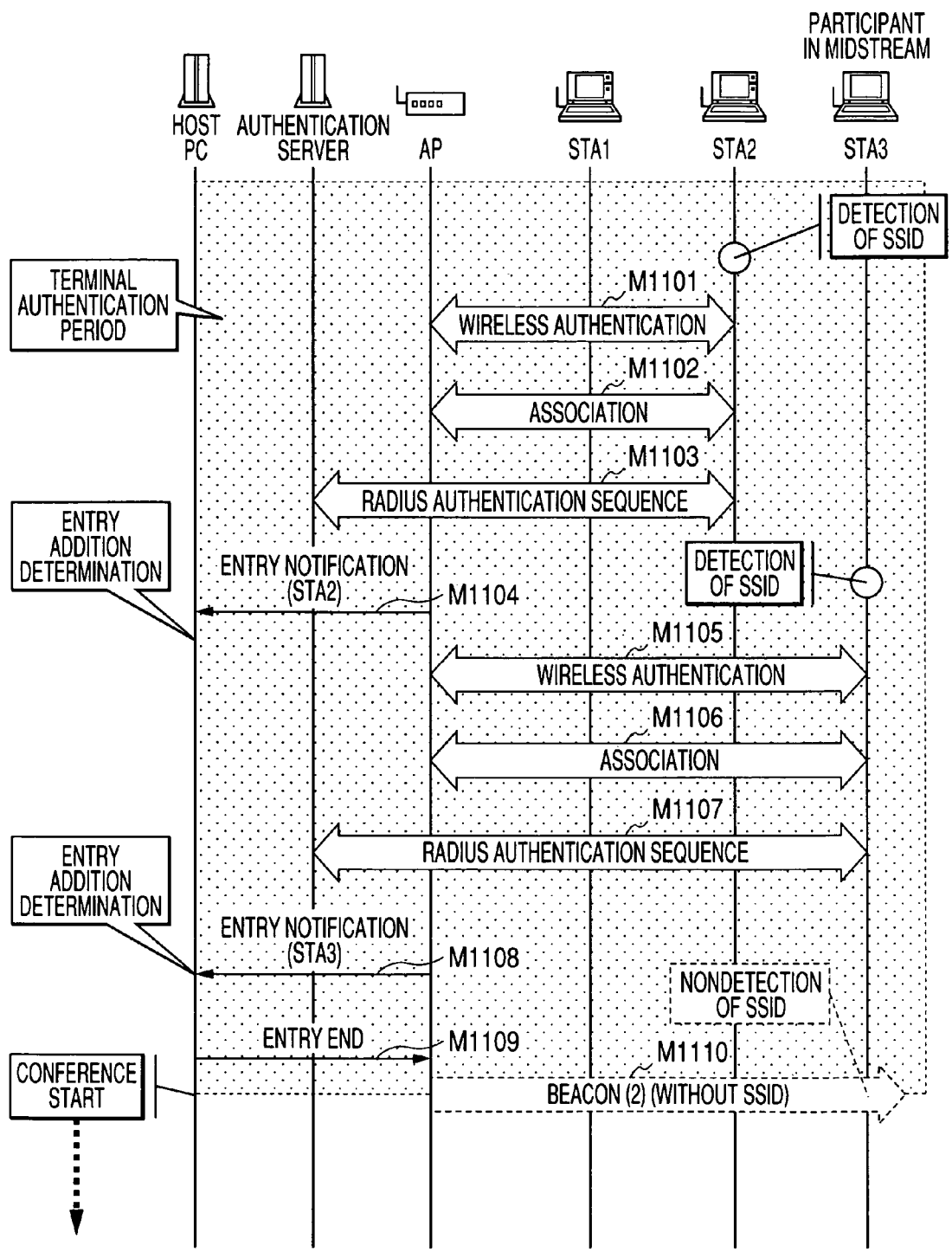
FIG. 11 is another sequence chart of the processing according to the second embodiment.
Figure 12:
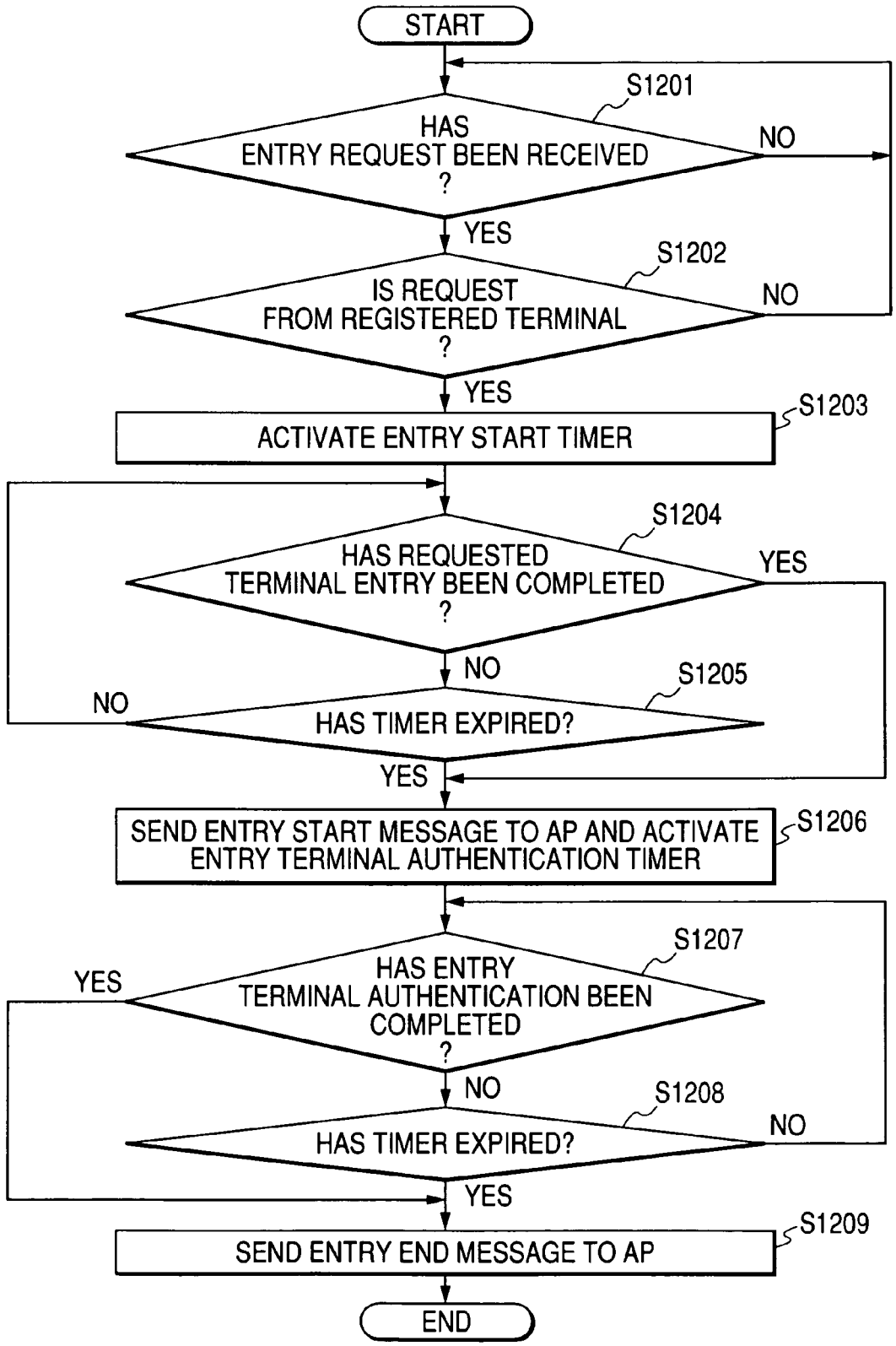
FIG. 12 is a process flowchart of a host PC according to the second embodiment.

Hereinafter, FIGS. 10 to 12 are used to describe a wireless communication system according to a second embodiment of the present invention.

FIG. 10 is a sequence chart 1 of a processing according to the second embodiment; FIG. 11 is another sequence chart 2 of the processing according to the second embodiment; and FIG. 12 is a process flowchart of the host PC 103 according to the second embodiment.

Only main messages involved in this embodiment are indicated in the above-mentioned sequence drawings. Other basic messages are partially omitted.

In FIG. 10, the power of the wireless access point device 102 in the wireless communication system is turned on, and starts to send out a beacon signal M300. At this time, in the SSID information element of the data frame of the beacon signal M300, the Length 904 is "0," and data is not set in the group identifier (SSID) 905. In other words, the beacon signal M300 indicates the state where the stealth mode is ON. In such a state, when the wireless terminal 1 (105) detects the beacon signal M300 <Step S501 of FIG. 5: YES> and finds that the group identifier (SSID) 905 does not exist <Step S502 of FIG. 5: NO>, the wireless terminal 1 (105) makes the inquiry about whether or not a wireless cell is available in the vicinity. In order to find the wireless access point device 102 that is connection-acceptable, the wireless terminal 1 (105) sends out an entry request message (probe request or the like for IEEE 802.11b) M1001, and activates a response timer (Step S503 of FIG. 5). Upon reception of the entry request message M1001 <Step S601 of FIG. 6: YES>, the wireless access point device 102 sends an entry response message (probe response or the like for IEEE 802.11b) M1002 to the wireless terminal 1 (105) (Step S602 of FIG. 6). Then, the wireless access point device 102 sends an entry request message M1003 to the host PC 103 (Step S603 of FIG. 6), and activates an entry start timer (Step S604 of FIG. 6).

Upon reception of the entry response message M1002 <Step S504 of FIG. 5: YES>, the wireless terminal 1 (105) shifts to the state for detecting a new beacon signal (Step S501 of FIG. 5). If the entry response message M1002 cannot be received <Step S504 of FIG. 5: NO>, the wireless terminal 1 (105) checks whether or not the timer has expired, and if the timer has not expired <Step S505 of FIG. 5: NO>, shifts back to the state of waiting for the entry response message M1002 from the wireless access point device 102 (Step S504 of FIG. 5). If the timer has expired <Step S505 of FIG. 5: YES>, the wireless terminal 1 (105) shifts to the state for detecting a new beacon signal (Step S501 of FIG. 5).

Similarly to the case with the wireless terminal 1 (105), when the wireless terminal 2 (106) detects the beacon signal M300 <Step S501 of FIG. 5: YES> and finds that the group identifier (SSID) 905 does not exist <Step S502 of FIG. 5: NO>, the wireless terminal 1 (105) makes the inquiry about whether or not a wireless cell is available in the vicinity. In order to find the wireless access point device 102 that is connection-acceptable, the wireless terminal 2 (106) sends out an entry request message (probe request or the like for IEEE 802.11b) M1004, and activates a response timer (Step S503 of FIG. 5). Upon reception of the entry request message M1004 <Step S601 of FIG. 6: YES>, the wireless access point device 102 sends an entry response message (probe response or the like for IEEE 802.11b) M1005 to the wireless terminal 2 (106) (Step S602 of FIG. 6). Then, the wireless access point device 102 sends an entry request message M1006 to the host PC 103 (Step S603 of FIG. 6), and activates an entry start timer (Step S604 of FIG. 6). Upon reception of the entry response message M1005 <Step S504 of FIG. 5: YES>, the wireless terminal 2 (106) shifts to the state for detecting a new beacon signal (Step S501 of FIG. 5). If the entry response message M1005 cannot be received <Step S504 of FIG. 5: NO>, the wireless terminal 2 (106) checks whether or not the timer has expired, and if the timer has not expired <Step S505 of FIG. 5: NO>, shifts back to the state of waiting for the entry response message M1005 from the wireless access point device 102 (Step S504 of FIG. 5). If the timer has expired <Step S505 of FIG. 5: YES>, the wireless terminal 2 (106) shifts to the state for detecting a new beacon signal (Step S501 of FIG. 5).

Further, similarly to the cases with the wireless terminal 1 (105) and the wireless terminal 2 (106), when the wireless terminal 3 (107) detects the beacon signal M300 <Step S501 of FIG. 5: YES> and finds that the group identifier (SSID) 905 does not exist <Step S502 of FIG. 5: NO>, the wireless terminal 1 (105) makes the inquiry about whether or not a wireless cell is available in the vicinity. In order to find the wireless access point device 102 that is connection-acceptable, the wireless terminal 3 (107) sends out an entry request message (probe request or the like for IEEE 802.11b) M1007, and activates a response timer (Step S503 of FIG. 5). Upon reception of the entry request message M1007 <Step S601 of FIG. 6: YES>, the wireless access point device 102 sends an entry response message (probe response or the like for IEEE 802.11b) M1008 to the wireless terminal 3 (107) (Step S602 of FIG. 6). Then, the wireless access point device 102 sends an entry request message M1009 to the host PC 103 (Step S603 of FIG. 6), and activates an entry start timer (Step S604 of FIG. 6). Upon reception of the entry response message M1008 <Step S504 of FIG. 5: YES>, the wireless terminal 3 (107) shifts to the state for detecting a new beacon signal (Step S501 of FIG. 5). If the entry response message M1008 cannot be received <Step S504 of FIG. 5: NO>, the wireless terminal 3 (107) checks whether or not the timer has expired, and if the timer has not expired <Step S505 of FIG. 5: NO>, shifts back to the state of waiting for the entry response message M1008 from the wireless access point device 102 (Step S504 of FIG. 5). If the timer has expired <Step S505 of FIG. 5: YES>, the wireless terminal 3 (107) shifts to the state for detecting a new beacon signal (Step S501 of FIG. 5).

Meanwhile, upon reception of the entry request message M1003 from the wireless terminal 1 (105) <Step S1201 of FIG. 12: YES>, the host PC 103 judges whether or not the entry request message M1003 is from the registered terminal. If being requested from the registered terminal <Step S1202 of FIG. 12: YES>, the host PC 103 activates the entry start timer (Step S1203 of FIG. 12).

Subsequently, the host PC 103 receives the entry request message M1006 and the entry request message M1009 from the wireless terminal 2 (106) and the wireless terminal 3 (107), respectively. At this time, it is judged whether or not an entry processing relating to the wireless terminal under registration has been completed. If not completed <Step S1204 of FIG. 12: NO>, the host PC 103 checks whether or not the timer has expired, and if the timer has not expired <Step S1205 of FIG. 12: NO>, shifts back to the state of waiting for the entry request message from the wireless access point device 102 (Step S1204 of FIG. 12).

If the timer has expired <Step S1205 of FIG. 12: YES>, or if the entry processing relating to the wireless terminal under registration has been completed <Step S1204 of FIG. 12: YES>, the host PC 103 sends an entry start message M1010 to the wireless access point device 102, and activates an entry terminal authentication timer (Step S1206 of FIG. 12). Upon reception of the entry start message M1010 <Step S605 of FIG. 6: YES>, the wireless access point device 102 starts to send a beacon signal M1011. At this time, in the SSID information element of the data frame of the beacon signal M1011, an authorized group identifier data is set in the group identifier (SSID) 905, and a predetermined value is set in the Length 904. In other words, the beacon signal M1011 indicates the state where the stealth mode is OFF (Step S608 of FIG. 6).

In such a state, the wireless terminal 1 (105) detects the beacon signal M1011 <Step S501 of FIG. 5: YES>. At this time, a group identifier (SSID=ABC123) 905 exists <Step S502 of FIG. 5: YES>, so the wireless access point device 102 is listed up as a wireless access point device to which the wireless terminal 1 (105) can be connected.

After that, by the selection operation of the wireless terminal 1 (105) by the user, the wireless terminal 1 (105) sends a wireless authentication request to the wireless access point device 102, and executes an authentication sequence processing M1012 (Step S506 of FIG. 5). Upon reception of the wireless authentication request <Step S701 of FIG. 7: YES>, the wireless access point device 102 executes the authentication sequence processing M1012 with respect to the wireless terminal 1 (105) (Step S702 of FIG. 7).

Upon completion of the authentication sequence processing M1012 <Step S507 of FIG. 5: YES>, the wireless terminal 1 (105) executes an association processing M1013 with respect to the wireless access point device 102 (Step S508 of FIG. 5 and Step S702 of FIG. 7). Upon completion of the association processing M1013 <Step S703 of FIG. 7: YES>, the wireless access point device 102 shifts to a state of waiting for execution completion detection of a RADIUS authentication sequence M1014 that is executed between the wireless terminal 1 (105) and the authentication server terminal 104 (Step S704 of FIG. 7). Upon completion of the RADIUS authentication sequence M1014 <Step S704 of FIG. 7: YES>, the wireless access point device 102 sends an entry notification message M1015 to the host PC 103, and activates the timer for waiting to receive the entry end message (Step S705 of FIG. 7).

In FIG. 11, similarly to the case with the wireless terminal 1 (105), when the stealth mode is OFF in the wireless access point device 102 (Step S608 of FIG. 6), the wireless terminal 2 (106) detects the beacon signal M1011 <Step S501 of FIG. 5: YES>. At this time, the group identifier (SSID=ABC123) 905 exists <Step S502 of FIG. 5: YES>, so the wireless access point device 102 is listed up as the wireless access point device to which the wireless terminal 2 (106) can be connected.

After that, by the selection operation of the wireless terminal 2 (106) by the user, the wireless terminal 2 (106) sends a wireless authentication request to the wireless access point device 102, and executes an authentication sequence processing M1101 (Step S506 of FIG. 5). Upon reception of the wireless authentication request <Step S701 of FIG. 7: YES>, the wireless access point device 102 executes the authentication sequence processing M1101 with respect to the wireless terminal 2 (106) (Step S702 of FIG. 7).

Upon completion of the authentication sequence processing M1101 <Step S507 of FIG. 5: YES>, the wireless terminal 2 (106) executes an association processing M1102 with respect to the wireless access point device 102 (Step S508 of FIG. 5 and Step S702 of FIG. 7). Upon completion of the association processing M1102 <Step S703 of FIG. 7: YES>, the wireless access point device 102 shifts to a state of waiting for execution completion detection of a RADIUS authentication sequence M1103 that is executed between the wireless terminal 2 (106) and the authentication server terminal 104 (Step S704 of FIG. 7). Upon completion of the RADIUS authentication sequence M1103 <Step S704 of FIG. 7: YES>, the wireless access point device 102 sends an entry notification message M1104 to the host PC 103, and activates the timer for waiting to receive an entry end message (Step S705 of FIG. 7).

Further, in the state where the stealth mode of the wireless access point device 102 is OFF (Step S608 of FIG. 6), the wireless terminal 3 (107) also detects the beacon signal M1011 <Step S501 of FIG. 5: YES> similarly to the cases with the wireless terminal 1 (105) and the wireless terminal 2 (106). At this time, the group identifier (SSID) 905 exists <Step S502 of FIG. 5: YES>, so the wireless access point device 102 is listed up as a wireless access point device to which the wireless terminal 3 (107) can be connected.

After that, by the selection operation of the wireless terminal 3 (107) by the user, the wireless terminal 3 (107) sends a wireless authentication request to the wireless access point device 102, and executes an authentication sequence processing M1105 (Step S506 of FIG. 5). Upon reception of the wireless authentication request <Step S701 of FIG. 7: YES>, the wireless access point device 102 executes the authentication sequence processing M1105 with respect to the wireless terminal 3 (107) (Step S702 of FIG. 7).

Upon completion of the authentication sequence processing M1105 <Step S507 of FIG. 5: YES>, the wireless terminal 3 (107) executes an association processing M1106 with respect to the wireless access point device 102 (Step S508 of FIG. 5 and Step S702 of FIG. 7). Upon completion of the association processing M1106 <Step S703 of FIG. 7: YES>, the wireless access point device 102 shifts to a state of waiting for execution completion detection of a RADIUS authentication sequence M1107 that is executed between the wireless terminal 3 (107) and the authentication server terminal 104 (Step S704 of FIG. 7). Upon completion of the RADIUS authentication sequence M1107 <Step S704 of FIG. 7: YES>, the wireless access point device 102 sends an entry notification message M1108 to the host PC 103, and activates the timer for waiting to receive an entry end message (Step S705 of FIG. 7).

Upon reception of the entry notification messages M1015, M1104, and M1108, the host PC 103 checks whether or not the entry processing relating to each wireless terminal whose entry was previously registered has been completed. If not completed <Step S1207 of FIG. 12: NO>, the host PC 103 checks whether or not the timer has expired, and if the timer has not expired <Step S1205 of FIG. 12: NO>, shifts back to the state of waiting for the entry request message from the wireless access point device 102 (Step S1207 of FIG. 12). As a result, if the entry notification messages M1015, M1104, and M1108 relating to another wireless terminal whose entry was previously registered cannot be received <Step S1207 of FIG. 12: NO>, the host PC 103 checks whether or not the timer has expired, and if the timer has not expired <Step S1208 of FIG. 12: NO>, shifts back to the state of waiting for the entry notification message from the wireless access point device 102 (Step S1207 of FIG. 12).

On the other hand, the host PC 103, which has received the entry notification messages M1015, M1104, and M1108 <Step S1207 of FIG. 12: YES>, checks whether or not the entry processing relating to each wireless terminal whose entry was previously registered has been completed. If completed <Step S1207 of FIG. 12: YES>, or if the entry start timer has expired <Step S1208 of FIG. 12: YES>, the host PC 103 sends an entry end message M1109 to the wireless access point device 102 (Step S1209 of FIG. 12). If the wireless access point device 102 receives the entry end message M1109 <Step S706 of FIG. 7: YES>, or if the timer for waiting to receive an entry end message expires <Step S707 of FIG. 7: YES>, the wireless access point device 102 starts to send out a beacon signal M1110 (Step S708 of FIG. 7). At this time, in the SSID information element of the data frame of the beacon signal M1110, the Length 904 is "0," and data is not set in the group identifier (SSID) 905. In other words, the beacon signal M1110 indicates the state where the stealth mode is ON.

Accordingly, the wireless access point device 102, the wireless terminal 1 (105), the wireless terminal 2 (106), and the wireless terminal 3 (107) form a wireless network configured based on the group identifier (SSID)=ABC123.

As described above, for allowing connection from a desired wireless terminal device, the timer is activated to start a period in which wireless terminal devices other than the desired wireless terminal device are capable of entry. If the activated timer has expired, or if connection requests have been received from all the connectable wireless terminal devices, the entry start can be instructed to a wireless access point device.

Other Embodiments

In the above-mentioned embodiments, when the stealth mode is OFF in the wireless access point device, the wireless terminal detects the beacon signal, detects that the group identifier (SSID=ABC123) exists, and lists up the wireless access point device as a wireless access point device to which the wireless terminal can be connected. After that, by the selection operation of the wireless terminal by the user, the wireless terminal executes the processing of accepting connection with the wireless access point device. However, the processing of accepting connection with the wireless access point device may similarly be realized without the selection operation of the wireless terminal by the user. In other words, the application on the wireless terminal may automatically select one from among a plurality of listed-up wireless access point devices as appropriate to thereby execute the processing of accepting the connection.

Further, the description of the above-mentioned embodiments illustrates that the wireless terminals 1, 2, and 3 each send an entry request message to the wireless access point device so that the sequence processing such as the wireless authentication can be executed on each wireless terminal. However, there are no limitations on the order for execution of the wireless terminals that each execute a series of sequence processings (in other words, any one of the wireless terminals may start the sequence first).

Further, the description of the above-mentioned embodiments illustrates that the host PC is provided within the network to execute the entry registration of the wireless terminals and other such control. However, the series of control processings executed by the host PC may similarly be executed by the wireless access point device. In other words, the host PC and the wireless access point device may be integrated into a single device to thereby realize the system.

The description of the above-mentioned embodiments is made by taking the wireless LAN as an example to illustrate the connection methods that allow the wireless terminals to access the network flexibly. However, without limitations thereon, any system may be adopted regardless of which of an analog signal and a digital signal is used therein as long as the wireless terminal is connected to the network adopting a method uses the group identifier to determine which wireless access point device to connect to in the system. Moreover, various modifications can be made within a scope of the present invention without departing from the gist thereof.

Figure 13:
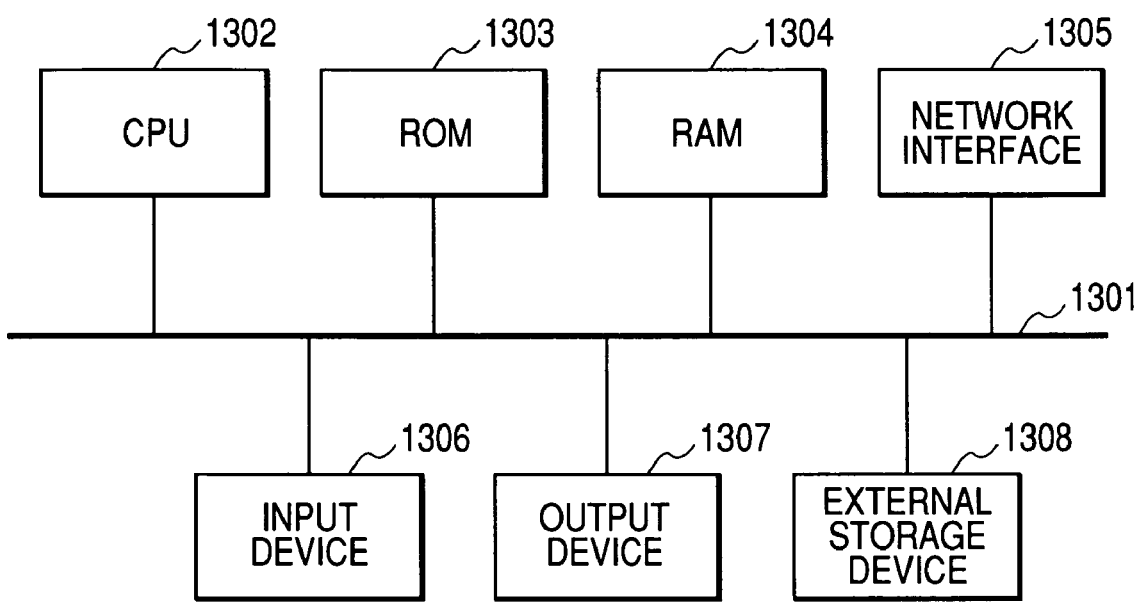
FIG. 13 is a block diagram showing an example hardware configuration of a computer.

FIG. 13 shows a hardware configuration as described above, which includes the wireless access point device 102, the host PC 103, the authentication server terminal 104, and the wireless terminals 105 to 108.

The configuration includes a bus 1301 that is connected to a central processing unit (CPU) 1302, a ROM 1303, a RAM 1304, a network interface 1305, an input device 1306, an output device 1307, and an external storage device 1308.

The CPU 1302 performs a data processing or calculation and control the other configuration elements connected to the CPU 1302 through the bus 1301.

The ROM 1303 previously stores a control procedure (computer program) of the CPU 1302. The computer program is loaded by the execution of the CPU 1302. The external storage device 1308 stores a computer program, and the computer program is copied to the RAM 1304 before its execution. The RAM 1304 is used as a work memory for data input/output and data send/receive and as a temporary memory for control of each configuration element. The external storage device 1308 is, for example, a hard disk drive or a CD-ROM, and holds its contents even after the shutdown. The CPU 1302 executes a computer program to perform the processings of the flowcharts of FIGS. 5 to 8 and 12.

The network interface 1305 is an interface for connecting to the network 101 shown in FIG. 1, a wireless LAN, etc. The input device 1306 is, for example, a keyboard and a mouse, and allows various designations and inputs. The output device 1307 is, for example, a display.

As described above, according to the first and second embodiments, during a terminal entry period before the conference start, the group identifier (SSID) is made publicly available, and a connection permission is granted to a wireless terminal used by an authorized conference participant. During the conference, the wireless access point device executes an SSID stealth function to hide the SSID from the third party, thereby avoiding their unauthorized access. After that, if a connection request is issued from a new wireless terminal, the host PC instructs the wireless access point device to turn the stealth mode off and the connection permission is granted to the wireless terminal. After it is confirmed that the connection to the wireless terminal has been established, the stealth function is again executed.

Normally, when the wireless access point device having a stealth mode, in which the group identifier (SSID) is hidden intentionally from the beacon information, receives a connection request from the pre-registered or permitted wireless terminal, the host PC performs management control to make publicly available the group identifier (SSID) included in the beacon information without such a conventional method as to have the administrator to cancel the stealth mode. Accordingly, the wireless terminal can appropriately select one from among wireless access point devices to which the wireless terminal can be connected based on the group identifier (SSID), thereby eliminating the difficulty in operation from the administrator and the wireless terminal user and producing an effect of enhanced convenience.

Further, the group identifier (SSID) that can identify the service area of a wireless LAN under operation is made publicly available only when a wireless terminal is connected thereto or the connection is accepted. Accordingly, the group identifier (SSID) does not need to be constantly sent out by being included in the beacon information, thereby improving security.

From the above description, it is highly expected that system resource starvation due to unnecessary access from a wireless communication device and deterioration in performance are avoided, and ease of access (which reduces user's connection operation and the like) to a wireless communication system and robust security are balanced.

The present invention can also realized by a program executed by a computer. Also adopted as another embodiment of the present invention is a means for supplying the program to the computer, for example, a computer-readable recording medium, such as a CD-ROM, on which the program is recorded, or a transmission medium, for example, the Internet for transmitting the program. Adopted as further another embodiment of the present invention is a computer program product using the computer-readable recording medium on which the program is recorded. The above-mentioned program, recording medium, transmission medium, and computer program product are included in the scope of the present invention. It is possible to use as the recording medium, for example, a flexible disk, a hard disk, an optical disk, magneto-optical disk, a CD-ROM, a magnetic tape, a non-volatile memory card, and a ROM.

It should be noted that any of the above embodiments merely represents specific examples for implementing the present invention, and the technical scope of the present invention should not construed to be limited to those embodiments. In other words, the present invention can be implemented in various forms without departing from its technical scope and its main features.

As described above, the present invention makes it possible to cancel the stealth mode by making the group identification information publicly available as necessary, and set the stealth mode by hiding the group identification information.

Further, it is possible to realize flexible control of connections between wireless communication devices, and avoid system resource starvation due to unnecessary access from a wireless communication device, deterioration in performance, and needless loads, thereby balancing ease of access and robust security.

This application claims priority from Japanese Patent Application No. 2004-062392 filed on Mar. 5, 2004, which is hereby incorporated by reference herein.

What is claimed is:

1. A wireless communication system, comprising:
a wireless access point device; and
a host device,
the wireless access point device comprising:
a first notification device configured to notify the host device of a connection request upon reception of the connection request from a wireless communication device;
a publicizing device configured to add group identification information to a beacon signal different from a response signal of the connection request, in response to an instruction to start an entry processing issued from the host device; and
a hiding device configured to hide the group identification information by hiding the group identification information in the beacon signal in response to an instruction to end the entry processing issued from the host device,
the host device comprising:
a judgment device configured to make a judgment as to whether or not to grant a connection permission to the wireless communication device that has issued the connection request upon reception of the connection request from the wireless access point device;
a start instructing device configured to instruct the wireless access point device to start the entry processing according to the judgment made by the judgment device; and
an end instructing device configured to instruct the wireless access point device to end the entry processing according to an entry completion notification of the wireless communication device issued from the wireless access point device.

2. A wireless communication system according to claim 1, wherein the wireless access point device further comprises:
an entry device configured to perform the entry processing on the wireless communication device;
an identification device configured to identify a result of an authentication processing between the wireless communication device and an authentication server; and
a second notification device configured to issue the entry completion notification to the host device based on an entry processing result of the entry device and an identification result of the identification device.

3. A wireless communication system according to claim 1, wherein the start instructing device instructs the wireless access point device to start the entry processing one of after an elapse of a predetermined period since the connection request is received from the wireless access point device and upon reception of connection requests corresponding to a plurality of pre-registered wireless terminal devices.

4. A wireless communication system according to claim 1, wherein the end instructing device instructs the wireless access point device to end the entry processing upon reception of entry completion notifications corresponding to a plurality of pre-registered wireless terminal devices.

5. A wireless communication system according to claim 1, wherein the host device is included in the wireless access point device.

6. A wireless communication system according to claim 1, wherein the hiding device hides the group identification information after an elapse of a predetermined period since the group identification information is made publicly available by the publicizing device.

7. A wireless access point device connected to a host device via a network, comprising:
a first notification device configured to notify the host device of a connection request upon reception of the connection request from a wireless communication device;
a publicizing device configured to add group identification information to a beacon signal different from a response signal of the connection request, in response to an instruction to start an entry processing issued from the host device; and a hiding device configured to hide the group identification information in the beacon signal in response to an instruction to end the entry processing issued from the host device.

8. A wireless access point device according to claim 7, further comprising:
   an entry device configured to perform the entry processing on the wireless communication device;
   an identification device configured to identify a result of an authentication processing between the wireless communication device and an authentication server; and
   a second notification device configured to issue the entry completion notification to the host device based on an entry processing result of the entry device and an identification result of the identification device.

9. A wireless access point device according to claim 7, wherein the host device is included in the wireless access point device.

10. A wireless access point device according to claim 7, wherein the hiding device hides the group identification information after an elapse of a predetermined period since the group identification information is made publicly available by the publicizing device.

11. A wireless access point device, comprising:
   a judgment device configured to make a judgment as to whether or not to grant a connection permission to a wireless communication device upon reception of a connection request from the wireless communication device;
   a publicizing device configured to add group identification information to a beacon signal different from a response signal of the connection request, according to the judgment made by the judgment device; and
   a hiding device configured to hide the group identification information by hiding the group identification information in the beacon signal according to an entry completion of a plurality of pre-registered wireless terminal devices.

12. A wireless access point device according to claim 11, wherein the hiding device hides the group identification information after an elapse of a predetermined period since the publicizing device adds the group identification information to the beacon signal.

13. A communication method for a wireless access point device connected to a host device via a network, comprising:
   a first notification step of notifying the host device of a connection request upon reception of the connection request from a wireless communication device;
   a publicizing step of making publicly available group identification information by adding the group identification information to a beacon signal different from a response signal of the connection request, in response to an instruction to start an entry processing issued from the host device; and
   a hiding step of hiding the group identification information by hiding the group identification information in the beacon signal in response to an instruction to end the entry processing issued from the host device.

14. A communication method for a wireless access point device, comprising:
   a judgment step of making a judgment at the wireless access point as to whether or not to grant a connection permission to a wireless communication device upon reception of a connection request from the wireless communication device;
   a publicizing step of making publicly available group identification information by adding the group identification information to a beacon signal different from a response signal of the connection request, according to the judgment of the judgment step; and
   a hiding step of hiding the group identification information by hiding the group identification information in the beacon signal according to an entry completion of a plurality of pre-registered wireless terminal devices.

15. A method of sending beacon information for a wireless access point device, comprising:
   a judgment step of making a judgment at the wireless access point as to whether or not a wireless communication device that has sent a connection request to a network is a predetermined wireless communication device; and
   a switching step of switching between sending of the beacon signal whose group identification is made publicly available, and sending of the beacon signal whose group identification is not made publicly available, according to the judgment of the judgment step, wherein the beacon signal differs from a response signal of the connection request;
   wherein the switching step allows the sending of the beacon information whose group identification is made publicly available if the wireless communication device that has sent the connection request is judged to be a predetermined wireless communication device according to the judgment of the judgment step, and allows the switching into the sending of the beacon information whose group identification is not made publicly available one of after completion of an entry processing of the wireless communication device with respect to the network and after an elapse of a predetermined period.

16. A non-transitory computer-readable recording medium having a stored computer program for controlling a wireless access point device connected to a host device via a network to execute:
   a first notification step of notifying the host device of a connection request upon reception of the connection request from a wireless communication device;
   a publicizing step of making publicly available group identification information by adding the group identification information to a beacon signal different from a response signal of the connection request, in response to an instruction to start an entry processing issued from the host device; and
   a hiding step of hiding the group identification information by hiding the group identification information in the beacon signal in response to an instruction to end the entry processing issued from the host device.

17. A non-transitory computer-readable recording medium having a stored computer program for controlling a wireless access point device to execute:
   a judgment step of making a judgment as to whether or not to grant a connection permission to a wireless communication device upon reception of a connection request from the wireless communication device;
   a publicizing step of making publicly available group identification information by adding the group identification information to a beacon signal different from a response signal of the connection request, according to the judgment of the judgment step; and
   a hiding step of hiding the group identification information by hiding the group identification information in the beacon signal according to an entry completion of a plurality of pre-registered wireless terminal devices.

18. A non-transitory computer-readable recording medium having a stored computer program for sending beacon information, controlling a wireless access point device to execute:

a judgment step of making a judgment as to whether or not a wireless communication device that has sent a connection request to a network is a predetermined wireless communication device; and a switching step of switching between sending of the beacon signal whose group identification is made publicly available, and sending of the beacon signal whose group identification is not made publicly available, according to the judgment of the judgment step, wherein the beacon signal differs from a response signal of the connection request.

* * * * *